United States Patent [19]

Reagle et al.

[11] Patent Number: 5,386,518
[45] Date of Patent: Jan. 31, 1995

[54] RECONFIGURABLE COMPUTER INTERFACE AND METHOD

[75] Inventors: Dennis J. Reagle, Riverside; Gregory D. Bolstad, Orange, both of Calif.

[73] Assignee: Hughes Aircraft Company, Los Angeles, Calif.

[21] Appl. No.: 17,222

[22] Filed: Feb. 12, 1993

[51] Int. Cl.[6] ............................................. G06F 13/00
[52] U.S. Cl. ............................. 395/325; 364/DIG. 1; 364/229; 364/229.2; 364/229.4; 364/231.5; 364/240; 364/240.8; 364/260; 364/260.1
[58] Field of Search ............... 395/325, 375, 425, 275; 360/48

[56] References Cited

U.S. PATENT DOCUMENTS

| | | | |
|---|---|---|---|
| 4,651,237 | 5/1987 | Williams | 360/48 |
| 4,852,157 | 7/1989 | Tyrrell | 379/236 |
| 4,891,709 | 1/1990 | Adams | 358/256 |
| 4,965,472 | 10/1990 | Anderson | 307/465 |
| 4,970,714 | 11/1990 | Chen et al. | 370/17 |
| 4,984,192 | 6/1991 | Flynn | 395/325 |
| 5,067,104 | 11/1991 | Krishnakumar et al. | 395/375 |
| 5,072,420 | 12/1991 | Conley et al. | 395/425 |
| 5,179,670 | 6/1993 | Farmwald et al. | 395/325 |
| 5,255,375 | 10/1993 | Crook et al. | 395/325 |
| 5,265,216 | 11/1993 | Murphy et al. | 395/325 |

FOREIGN PATENT DOCUMENTS

| | | |
|---|---|---|
| 0185098 | 6/1986 | European Pat. Off. |
| 0367284 | 5/1990 | European Pat. Off. |
| 2255212 | 10/1992 | United Kingdom. |

*Primary Examiner*—Jack B. Harvey
*Assistant Examiner*—Ayaz R. Sheikh
*Attorney, Agent, or Firm*—W. K. Denson-Low

[57] ABSTRACT

A reconfigurable computer interface for use in interfacing a first subsystem to a second subsystem including a reconfigurable state machine mechanism for generating a plurality of interface control signals in accordance with a state table in response to a plurality of mode control signals. A first mechanism is included for generating the state table and a second mechanism is provided for generating the mode control signals with each transmitted to the reconfigurable state machine mechanism. In a preferred embodiment, an initiation logic device generates and downloads a state table and a plurality of mode control signals to a programmable state machine when the reconfigurable computer interface is utilized to connect a new external peripheral device to a signal processing system. The state table defines the characteristics of the state machine and the state machine controls the operation of the reconfigurable computer interface. The programmable state machine utilizes the present state, the state table and the mode control signals to determine the next machine state which provides rapid and convenient reconfigurability of the interface circuit to connect a variety of external devices to the signal processing system. A bus sizing register circuit is included to modify the word size of a plurality of data signals and temporary memory is also included.

12 Claims, 5 Drawing Sheets

RECONFIGURABLE COMPUTER INTERFACE AND METHOD

This invention was made with Government support under Contract No. F42650-89-C-3701 awarded by Department of the Air Force. The Government has certain rights in this invention.

BACKGROUND OF THE INVENTION

1. Field of the Invention

The present invention relates to computer interface control circuitry. More specifically, the present invention relates to methods and apparatus for providing a high speed, programmable interface circuit for use with computers or other data or signal processing equipment.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Computer interface control circuits are utilized to connect an external peripheral device such as a tape drive, disk drive, sensor device or the like to the internal circuitry of signal or data processing equipment. External peripheral devices often communicate with the signal and data processing equipment in accordance with different protocols (e.g., data formats, signal levels, framing of words, timing of bits, etc.). Further, signal and data processing equipment often support multiple external devices. Therefore, a computer interface control circuit often must be reconfigured for each external device that it is connected to. The interface often also utilizes a different protocol from that used by the interfaced circuits.

Conventional computer interface control circuits are typically implemented with either a hardwired logic interface, a PROM based state machine interface or a microprocessor controlled interface. A hardwired logic interface is a special purpose, dedicated interface circuit that typically exhibits a fast data rate. However, a major disadvantage of the hardwired logic interface is that it is not reconfigurable. The hardwired logic interface enables communication between the processing equipment and a particular external device. However, it cannot be easily modified to permit communication between the processing equipment and another external peripheral device without time consuming physical circuit changes. The hardwired logic interface requires a different hardware logic design for each change to the interface protocol.

The PROM based state machine interface is also designed to operate with a particular external peripheral device. The PROM based interface has the disadvantage of requiring that the PROM be reprogrammed or replaced in order to reconfigure the interface to support a different external device. This requirement results in substantial downtime of the external device and hardware changes to the interface. Therefore, when utilizing the PROM based interface, a separate PROM based circuit is required for each external device that the interface supports. The microprocessor controlled interface is easily reconfigurable while in the circuit between the signal processing equipment and the external device. However, a dedicated microprocessor is required. Although the dedicated microprocessor is typically fast, the execution of multiple instructions for each interface control activity results in a slow interface relative to the system clock speed. Therefore, the microprocessor controlled interface does not support high data rates.

The main disadvantages associated with reconfiguring conventional computer interface control circuits to connect various external devices to the signal or data processing equipment include major hardware modifications, excessive time to complete modifications and slow operating speed (e.g., low data rates). A computer interface control circuit is not available that is easily reconfigurable while in circuit for connecting a plurality of external devices to the signal or data processing equipment that can adapt to a variety of interface protocols, is autonomous of a host computer and provides a high rate of data transfer.

Thus, there is a need in the art for improvements in the design of computer interface control circuits to ensure autonomous operation and rapid and convenient reconfigurability of the interface circuit used to connect a variety of external devices to signal or data processing equipment.

SUMMARY OF THE INVENTION

The need in the art is addressed by the reconfigurable computer interface and method of the present invention. The invention is employed for interfacing a first subsystem to a second subsystem and includes a reconfigurable state machine for generating a plurality of interface control signals in accordance with a state table in response to a plurality of mode control signals. A first mechanism is included for generating the state table and a second mechanism is provided for generating the mode control signals for the reconfigurable state machine.

In a preferred embodiment, an initiation logic device generates and downloads a state table and a plurality of mode control signals to a programmable state machine when the reconfigurable computer interface is utilized to connect a new external peripheral device to a signal processing system. The state table defines the characteristics of the state machine and the state machine controls the operation of the reconfigurable computer interface. The programmable state machine utilizes the present state, the state table and the mode control signals to determine the next machine state which provides rapid and convenient reconfigurability of the interface circuit to connect a variety of external devices to the signal processing system. A bus sizing register circuit is included to modify the word size of a plurality of data signals and temporary memory is also included.

DESCRIPTION OF THE INVENTION

Figure 1:
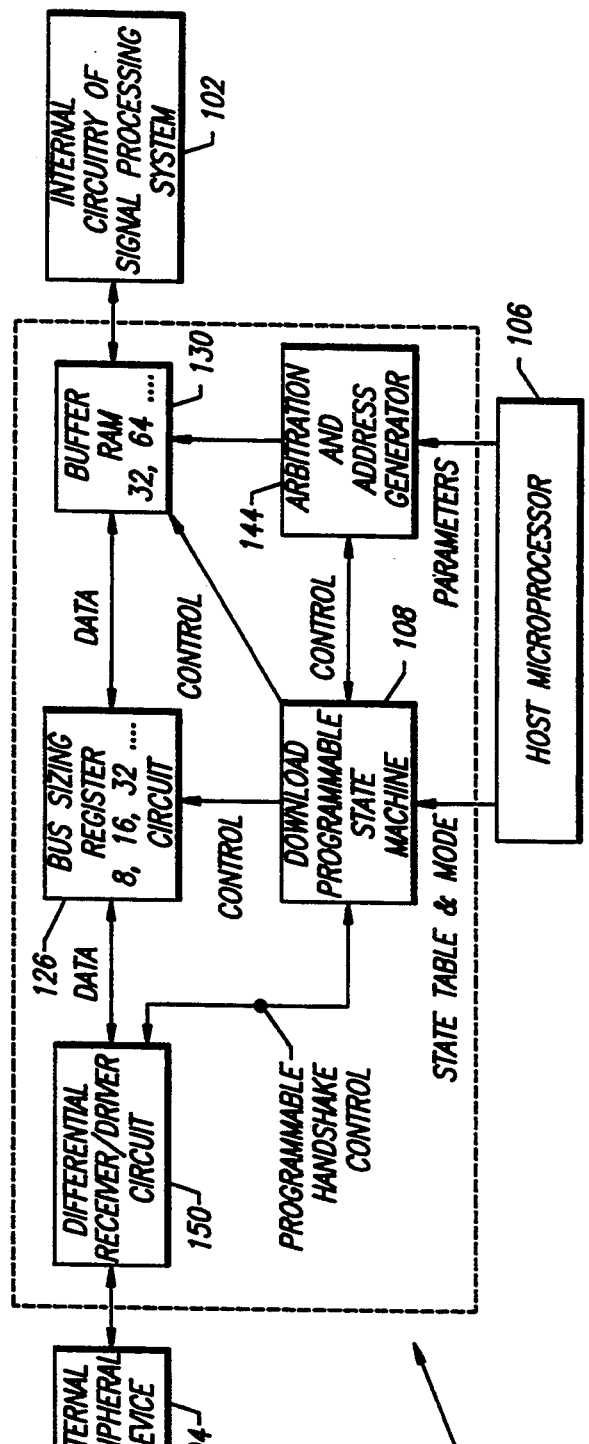
FIG. 1 is a block diagram of an illustrative embodiment of the reconfigurable computer interface of the present invention shown as a communication link between the internal circuitry of a signal processing system and an external peripheral device.

The invention is a reconfigurable computer interface 100 as shown in FIG. 1. The interface 100 is positioned between the internal circuitry of a signal processing system 102 and at least one external peripheral device 104 and serves as a communication link therebetween. The signal processing system 102 can be any suitable fixed hardware signal or data processing equipment ranging from a portion of a circuit card to a mainframe computer. The external device 104 can be any of a wide variety of computer peripheral equipment such as, for example, a tape drive, a disk drive, an infrared or temperature or electromagnetic sensor, digital or video equipment and the like.

The interface 100 is also connected to a host microprocessor 106 for receiving a plurality of control data therefrom. The host microprocessor 106 can be any processing device suitable for providing the plurality of control data to the interface 100 as discussed hereinbelow. The host 106 includes software written in a high level language in the form of a state equation. When the software is compiled and executed in the host 106, the plurality of control data (e.g., a block of state table data) is generated. The block of state table data includes both a state table and a plurality of control signals or mode signals which fully define the operating characteristics of the interface 100. The accuracy of the state table data can be verified prior to utilization by executing the software program on a computer and saving the state table data to file for subsequent analysis. When the software defining the characteristics of the interface 100 is executed on the host 106, the state table data is generated and downloaded to the interface 100 within a few milliseconds. It is noted that the operation of the interface 100 is completely autonomous of the host 106 after the state table and plurality of mode signals have been downloaded.

The interface 100 includes a download programmable state machine 108 as shown in FIG. 1. The state machine 108 receives and is initialized by the block of state table data downloaded from the host 106. The state table generated by and downloaded from the host 106 defines the behavior of the state machine 108. The mode signals determine which portion of the state table is utilized by the state machine 108 at any instant of time. After the state machine 108 has received the block of state table data from the host 106, each of the remaining components of the interface 100 is controlled by the state machine 108. At that time, the state machine 108 is autonomous from the host 106. Thus, the efficiency of the host 106 is improved since microprocessor time is economized. Further, it is noted that the host 106 and the interface 100 can be constructed on the same circuit board. This design eliminates the need for storage space for the block of state table data thus improving the space economy of the present invention.

Figure 2:
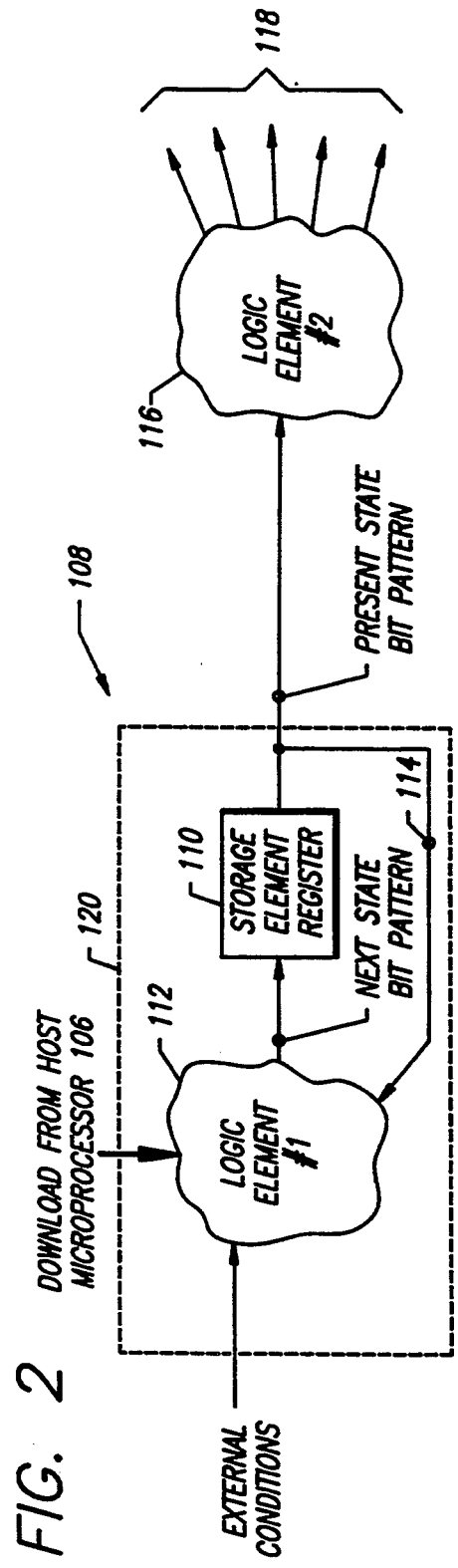
FIG. 2 is a simplified block diagram of a download programmable state machine employed within the reconfigurable computer interface of FIG. 1.

A general diagram of the state machine 108 is shown in FIG. 2. The state machine 108, which can be implemented in hardware and software, is comprised of a storage element register 110 which is a one-word memory element. The register 110 stores a logical word containing a specified bit pattern and the logical word defines a particular state of the state machine 108. Thus, at any instant of time, the register 110 stores the present state of the state machine 108. The output signal of the register 110 is the bit pattern which represents the present state signal. In communication with the register 110 is a first logic element 112. The first logic element 112 receives several input signals including the present state signal feedback from register 110 on a line 114. First logic element 112 also receives the downloaded state table data from the host 106 including the state table and the mode signals. In FIG. 2, the mode signals are part of the external conditions which are applied to the state machine 108 to influence the operation thereof. The external conditions also include a programmable handshake control from the circuit 150 described hereinbelow.

Based upon the present state signal, the state table and the external conditions, the first logic element 112 determines what the next state of the state machine 108 should be. The next state signal is then transmitted and stored in the storage element register 110. The register 110 is also connected to a second logic element 116 as shown in FIG. 2. The second logic element 116 also receives the present state signal from the register 110 and then generates a plurality of output signals represented by the numeral 118. The output signals 118 typically are utilized to control other components of the interface 100.

It is noted that the generation of the next state signal is influenced by the state table and mode signals received at the first logic element 112 from the host 106. In general, the state table is altered when the interface 100 connects the internal circuitry of the signal processing system 102 to a new external peripheral device 104 different from previous external devices. Under these conditions, the altered state table and mode signals rapidly reconfigure the programmable state machine 108 to function as an effective communication link between the processing system 102 and the external device 104. Rapid reconfiguration in the present invention is interpreted to mean that the interface characteristics of the interface 100 can be modified in a matter of minutes verses several months as was required in the prior art. Since the interface 100 is software reconfigurable, it enables a wide variety of external devices 104 having different data formats, signal levels, framing of words, timing of bits, etc. to be connected to the processing system 102 without the need to modify interface hardware.

Figure 3A:
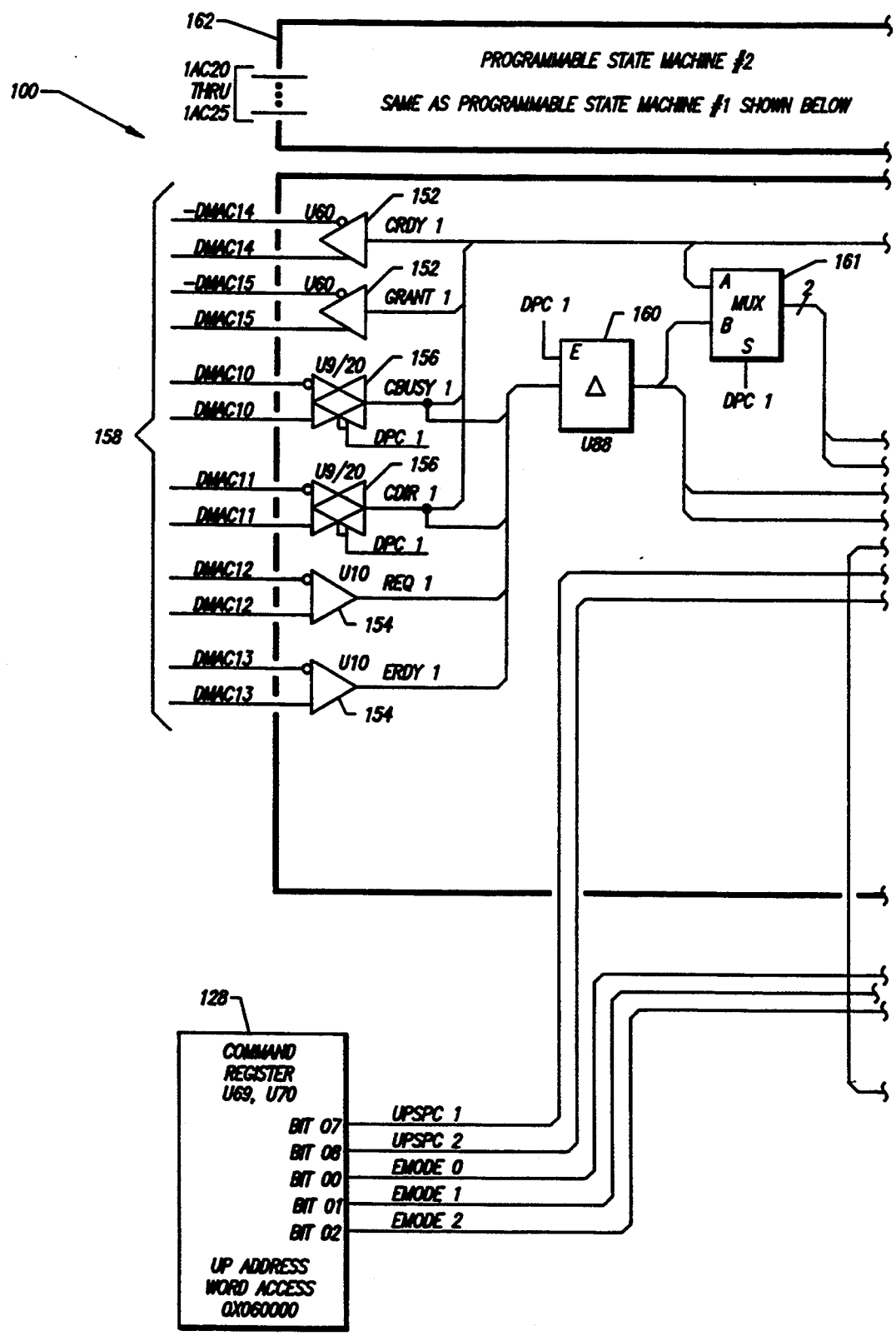
FIG. 3 is a more detailed block diagram of the reconfigurable computer interface of FIG. 1 showing the download programmable state machine as the main structural element of the interface.
Figure 3B:
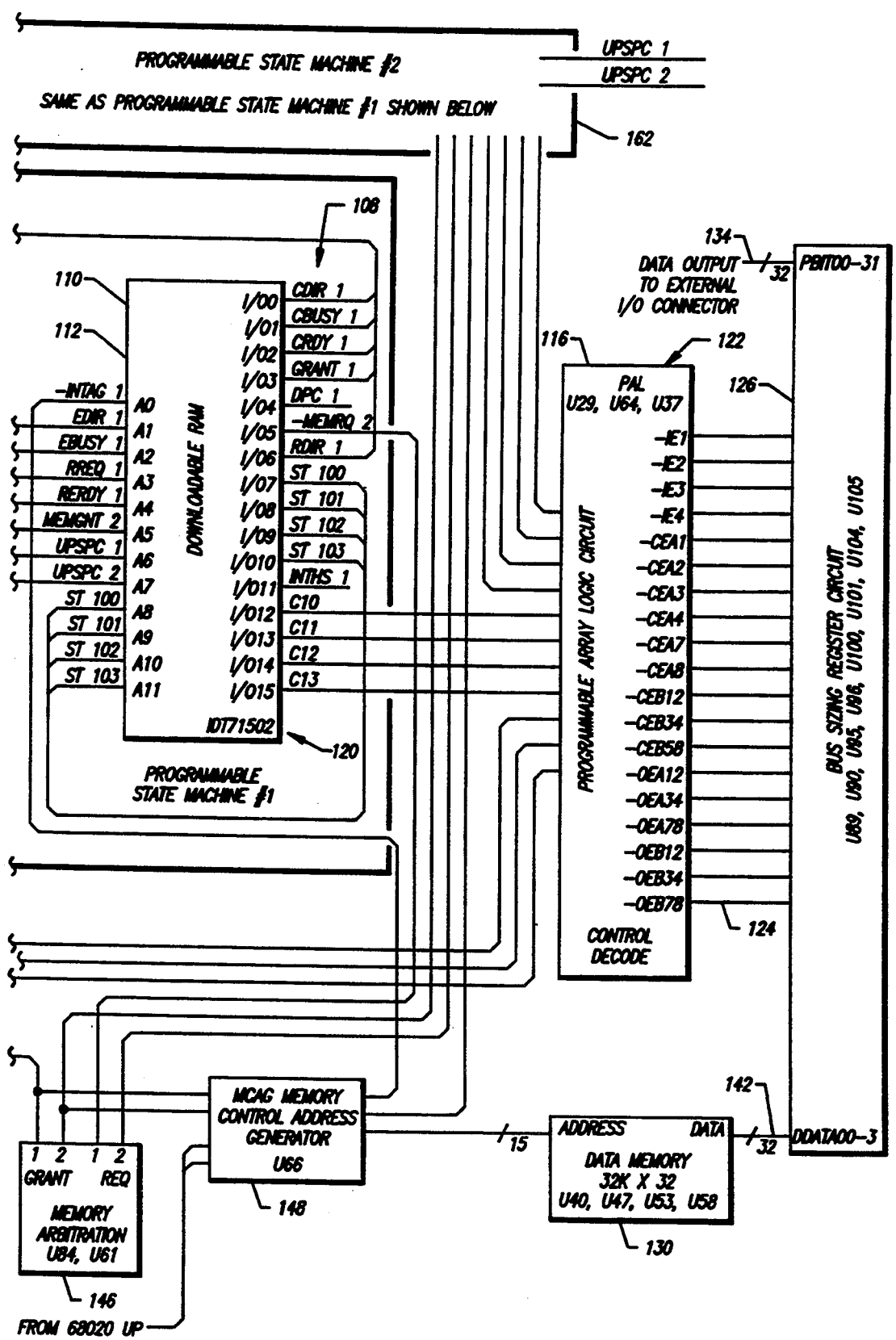

The state machine 108 is shown in more detail in the specific implementation of the interface 100 illustrated in FIG. 3. The state machine 108 comprises two main elements including a downloadable random access memory (RAM) 120 and a programmable array logic (PAL) element 122. The downloadable RAM 120 contains the storage element register 110 which serves to store the current state signal of the state machine 108. The downloadable RAM 120 also contains a large memory for storing the state table received from the host 106. Further, the downloadable RAM 120 emulates the function of the first logic element 112 and the storage element register 110 of FIG. 2. The first logic element 112 is an implementation of the state table. Thus, the downloadable RAM 120 evaluates the present state signal, the state table and the external mode signals to generate the next state signal and the next state output signals. The next state signal is stored in the storage element register 110.

The downloadable RAM 120 of the state machine 108 receives the state table and mode signals downloaded from the host 106. The mode signals downloaded to the RAM 120 shown in FIG. 3 determine which portion of the state table is utilized by the state machine 108. (The mode signals are also shown as external conditions arrowed to the first logic element 112 in FIG. 2.) This design enables several different selectable modes of operation of the state table. The host 106 generates the mode signals and writes them into a command register 128 as shown in FIG. 3. The command register 128 provides storage for the mode signals and transfers the mode signals to the programmable state machine 108 on a continuous basis.

The programmable array logic (PAL) circuit 122 included within the programmable state machine 108 emulates the function of the second logic element 116 of FIG. 2. The PAL circuit 122 decodes part of the current state signals or output signals 118 (shown in FIG. 2) into control signals 124 for a bus sizing register circuit 126 shown in FIG. 3. The control signals 124 control the loading and enabling of data within the bus sizing register circuit 126. The bus sizing register circuit 126 is comprised of a plurality of registers 132 shown in FIG. 4. The registers 132 are connected in a manner to match the word size utilized by the external peripheral device 104 to the word size utilized by the internal circuitry of the signal processing system 102. In effect, this enables the external device 104 to communicate with the processing system 102 and further efficiently utilizes the storage space of a buffer RAM 130 shown in FIG. 1.

In the input case, when data travels from the external peripheral device 104 to the signal processing system 102, data is packed. If the input data words from the external device 104 are, for example, eight bits wide and the data words of the signal processing system are, for example, thirty-two bits wide, the data is packed as follows. Four 8-bit words can be packed into a single 32-bit word by the bus sizing registers 132. Conversely, in the output case, data transmitted from the signal processing system 102 to the external peripheral device 104 via the buffer RAM 130 is unpacked. Thus, the larger 32-bit word is reduced in size to, for example, four 8-bit words. The state machine controlled bus sizing registers 132 enable the internal circuitry of the signal processing system 102 to accept 8, 16 or 32-bit bidirectional or unidirectional data, dependent upon the interface mode selected and the state table that is downloaded to the programmable state machine 108.

Figure 4:
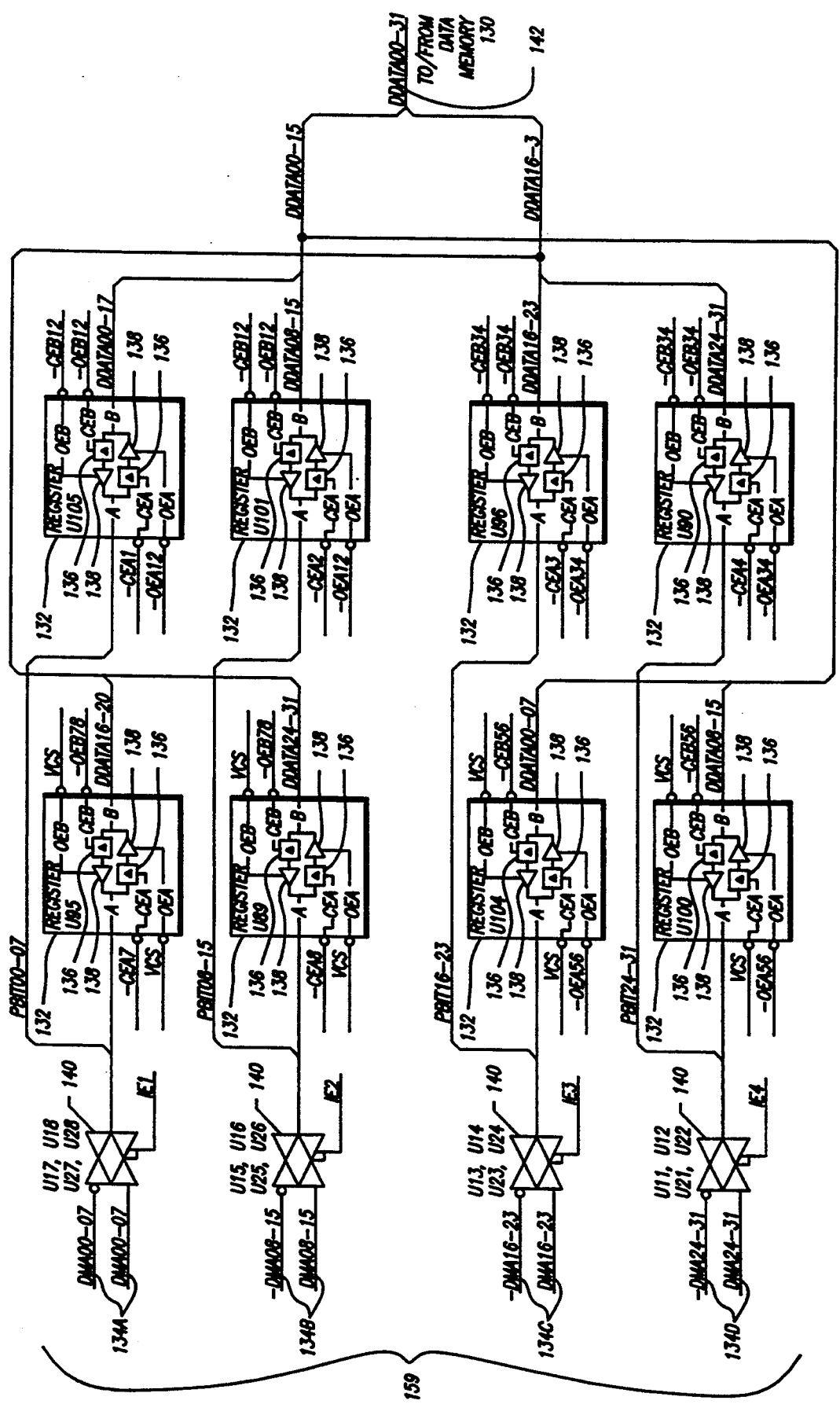
FIG. 4 is a circuit diagram of a plurality of bidirectional registers which form the bus sizing register circuit of the reconfigurable computer interface shown in FIGS. 1 and 3.

There are eight bus sizing registers 132 shown in FIG. 4, however other combinations may be suitable. The bus sizing register elements actually perform the packing and unpacking of the data words transmitted between the processing system 102 and the external device 104. Each bus sizing register 132 includes two register elements 136 and two tri-state output buffers 138. As is known in the art, one register element 136 and one buffer 138 are utilized for input data transfers from the external device 104 to the processing system 102. Likewise, the remaining register element 136 and buffer 138 are utilized for output data transfers from the processing system 102 to the external device 104. The bus sizing registers 132 of FIG. 4 are located within the bus sizing register circuit 126 shown in FIG. 3.

The data output from each of the registers 132 is connected to a differential driver/receiver 140 as shown in FIG. 4. Under the proper conditions, the driver/receivers 140 permit data to pass in both directions. The output terminals of the driver/receivers 140 are connected to a plurality of data lines identified by the numeral sequence 134A, 134B, 134C and 134D in FIG. 4. The data output line from the bus sizing register circuit 126 (which combines the plurality of data lines 134A, 134B, 134C and 134D) to an external connector (not shown) is identified by the numeral 134 on FIG. 3. The remaining line shown connected between the bus sizing registers 132 and a data memory (e.g., buffer RAM) 130 is identified by the numeral 142 on both FIGS. 3 and 4.

The buffer RAM 130 shown in FIG. 1 is located within the data path between the external peripheral device 104 and the signal processing system 102. Under the direction of control signals from the state machine 108, the buffer RAM 130 temporarily stores data transmitted from the external device 104 to the processing system 102. Likewise, the buffer RAM 130 provides temporary storage for data transmitted from the internal circuitry of the processing system 102 to the external device 104. In the specific implementation shown in FIG. 3, the buffer RAM 130 is shown as a (32K×32) bit data memory.

Under the control of signals from the state machine 108, storage addresses located within the buffer RAM 130 are allocated by an arbitration and address generator 144 as shown in FIG. 1. When a data word is transmitted along the data path between the external device 104 and the processing system 102, the buffer RAM 130 is accessed. Before the data word is received and stored in the buffer RAM 130, the state machine 108 sends a memory request to the arbitration and address generator 144 to select a storage location. The selected storage location, which is selected sequentially, is then transferred to the buffer RAM 130 from the arbitration and address generator 144. The buffer RAM 130 then stores the data word at the address selected by the arbitration and address generator 144.

The operation of the arbitration and address generator 144 is defined by starting address and ending address parameters. These parameters are loaded into the arbitration and address generator 144 from the host 106 as shown in FIG. 1 prior to beginning the transfer of a block of data. The storage location for the data word within the buffer RAM 130 is a specific location. As each memory request is received by the arbitration and address generator 144, a specific address is assigned in the buffer RAM 130. Each memory request serves to increment the arbitration and address generator 144 by one count.

In the embodiment disclosed in FIG. 3, the arbitration and address generator 144 is implemented in the form of a memory arbitration device 146 and a memory control address generator (MCAG) 148. The memory arbitration device 146 inspects the memory requests for data word storage in the data memory (buffer RAM) 130 from the state machine 108 (for data words from the external device 104) and from the internal circuitry (for data words from the processing system 102). After inspection, the memory arbitration device 146 decides which data words are to be entered into the data memory 130 based upon defined access priorities. Thereafter, the memory arbitration device 146 controls access of specific data to the data memory 130 and transmits a memory grant signal to the state machine 108 to indicate admission. The memory grant signal causes the arbitration and address generator 144 to increase the count from the starting address to the ending address by one increment. Additionally, the transmitted memory arbitration grant signal to the state machine 108 indicates that a memory location in the data memory 130 is available.

The memory control address generator 148 serves to generate addresses for the data memory 130. The starting address and ending address parameters received from the host 106 are loaded into the address generator 148. The first address within the data memory 130 assigned by the address generator 148 represents the starting address parameter. As each address within the data memory 130 is assigned, the address generator 148 is incremented by one numerical count. When the numerical count reaches the ending address parameter, a transfer complete signal is sent from the address generator 148 to the state machine 108.

The differential receiver/driver circuit 150 shown in FIG. 1 receives and transmits data words between the external peripheral device 104 and the signal processing system 102. Further, the receiver/driver circuit 150 receives control signals from and transfers control signals to the programmable state machine 108. The direction of transmission of the data and control signals is controlled by the state machine 108. In the data path, data words are transmitted to and received from the bus sizing register circuit 126. External peripheral devices 104 often communicate with the signal processing system 102 in different protocols (e.g., data formats, signal levels, framing of words, timing of bits, etc.). Therefore, the receiver/driver circuit 150 functions to translate the electrical level of the control signals and data words received from and sent to the external device 104 to the electrical level of the interface 100.

The differential receiver/driver circuit 150 includes a plurality of differential drivers 152 and a plurality of differential receivers 154 shown in FIG. 3, and a plurality of differential driver/receivers 156, 134A, 134B, 134C and 134D as shown in FIGS. 3 and 4, respectively. Each of the drivers 152, receivers 154 and receiver/drivers 156 (shown in FIG. 3) and receiver/drivers 134A, 134B, 134C and 134D (shown in FIG. 4) include a plurality of terminations 158 and 159, respectively, that carry control signals and data words to and/or from the external peripheral device 104. It is the selection of the proper terminations 158 and 159 that enables the translation of the electrical level of the control signals and data words received from and sent to the external device to the electrical level of the interface 100. Further, the input stage of the differential receiver/driver circuit 150 includes a large common mode operating range to ensure translation of the control signals and data words that are outside of the normal operating range of the interface 100. Each of the control signals input from the receivers 154 and the receiver/drivers 156 are connected to an input register circuit 160 to reduce metastable conditions on the control inputs. In addition, the two control inputs from the receiver/drivers 156 are multiplexed with the output signals from the state machine 108 in a multiplexer processing circuit 161. This design enables the state machine 108 to select the external conditions.

The interface 100 has been implemented in a programmable signal processor as part of the input/output control interface (CIO) circuit card assembly (not shown) for connecting an external device 104 to a processing system 102. In this system, the present invention performs as a smart interface utilizing a state table generation program which can comply with specific requirements. The interface 100 is generally applicable to and finds utility in any data processing, signal processing or computer device 102 that requires an interface which can be quickly reconfigured while in circuit to communicate with a wide variety of external peripheral devices 104. The interface 100 also enjoys high speed, autonomous operation, supporting data interface rates that are equal to the system clock rate. Further, a variety of input voltage levels, such as differential and single ended Transistor-Transistor Logic (TTL) and Emitter-Coupled Logic (ECL) can be accepted by adjusting the termination bias of the differential receivers 154 shown in FIG. 3. It is further noted that multiple programmable state machines (see the additional state machine 162 in FIG. 3) can be used to add increased capability such as multiple ports or expanded bus width.

One of the many applications of the reconfigurable computer interface 100 is disclosed in the following example. The interface 100 is an input/output port of 32 bits of differential data which is under the control of one or two programmable handshake state machines 108 and 162. The data port is configured by the host microprocessor 106 as byte, word or longword bidirectional or as byte or word unidirectional. To maximize the available input/output memory 130 all data is packed to longwords prior to memory storage and unpacked as necessary by the bus sizing register circuit 126 when output. All handshaking and data packing and unpacking is under the control of the programmable state machine 108 or 162.

Each state machine 108 and 162 is implemented with a registered static downloadable RAM 120 that is (4K×16) bit with the serial protocol channel. The RAM 120 has sixteen registered outputs which provide four bits of present state, four bits of pack/unpack register command, six I/O handshake lines, port direction control, memory access request and the transfer complete interrupt. The twelve address inputs to the RAM 120 receive four bits of the present state feedback, two bits of the microprocessor mode control bits, four I/O handshake lines, memory access granted from memory arbitration 146 and the address generator done interrupt from the memory control & address generator 148. The downloadable RAM 120 can be loaded with specific state table data from the host 106.

Data enters and exits the external data lines 134 of the bus sizing register circuit 126 (see FIG. 3) which includes the eight bidirectional bus sizing registers 132 (see FIG. 4). The control signals for the bus sizing registers 132 are decoded from the state machine pack/unpack command and three EMODE bits from the command register 128 shown in FIG. 3. The decoding is completed within the programmable array logic (PAL) circuit 122. The data lines 142 of the bus sizing register circuit 126 is connected to the data memory 130 which is 32-bits wide and 32K words deep. All accesses to the data memory 130 are 32-bits wide. The addressing is from the address generator 148 where one of three address generators or the microprocessor address bus is multiplexed through to the data memory 130. The first and second address generators 148 are associated with the programmable state machines 108 and 162, respectively. The control of the multiplexer processing circuit 161 is the result of the state machine 108. The memory arbitration device 146 accepts memory requests from state machines 108 and 162, an internal global memory port control logic, and the host 106 and determines which device receives the memory grant signal for each memory access time.

The port handshake lines for state machine 108 include two dedicated inputs, two dedicated outputs and two bidirectional handshake lines. The maximum port control signals available are four dedicated inputs, four dedicated outputs and four bidirectional signals. Half of these control signals are associated with state machine 162 and are normally used only in the word or byte unidirectional output mode. Mode control signals are provided by the host 106 via the command register 128.

In the implemented state machine 108, some of the registered outputs of the downloadable RAM 120 provide the present state of the state machine 108 and others provide bus sizing register command words, I/O handshake lines, memory requests, port direction control and the transfer complete interrupt. The present state is wrapped back to the address input of the downloadable RAM 120 along with external I/O handshake inputs and microprocessor mode inputs to provide stimulus for the next state. The state word is four bits wide which limits the state machine to sixteen possible states.

The bus sizing registers 132 provide the capability of accepting or sending data as bytes, words or longwords in the bidirectional mode and as words or bytes in the unidirectional mode. The registers are controlled by the control signals decoded from the bus sizing command bits output from the state machine 108 and the external mode bits from the command register 128. In the bidirectional mode, only one downloadable RAM 120 is utilized for control of the port and external jumpers are required for byte and word transfers. As an example, when in bidirectional mode and accepting word transfers, the Least Significant Word is jumped to the Most Significant Word at the cabinet connector. The bus sizing registers 132 then pack two words into one longword prior to transfer to the data memory 130. When both downloadable RAM's are used (unidirectional mode), two ports of byte or word size can be controlled individually by the two state machines 108 and 162. One port is dedicated to the input data and one port is dedicated to the output data.

When operated in the byte, word or longword (single port) bidirectional mode, the data is transmitted and received through bidirectional bus sizing registers 132 (e.g., U105, U101, U96 and U90). When transmitted, the data is clocked into the registers 132 as a 32-bit word and the output is enabled. The differential drivers 140 are enabled together for a longword, two at a time for a word transfer and one at a time for a byte transfer under control of the state machine 108. The output signals are enabled when the IEx signals are active low.

To receive data, all of the input differential receivers 154 are enabled. The inputs are enabled when the IEx signals are active high. Longword inputs are enabled when the clock enable controls for all four bidirectional registers are asserted at once under control of the state machine 108. Word transfers are input by enabling bus sizing registers 132 (e.g., U90 and U96) first and then bus sizing registers 132 (e.g., U101 and U105) second. Byte transfers are input by enabling the registers 132 one at a time. The B outputs of all four registers 132 are then turned on together to enable a longword write to the data memory 130.

In the dual port unidirectional input mode, unidirectional transfers are only possible for word and byte size data. Unidirectional input transfers are controlled by state machine 108. Differential receivers 140 (e.g., U18, U17, U16 and U15) are enabled to select bits 00 through 15 as the input data. For a word transfer, the port A clock enables are asserted for registers 132 (e.g., U95 and U89) first then port A clock enables registers 132 (e.g., U105 and U101) second. Once two words have been loaded, the port B output enables for the same four registers 132 to provide a single longword write to the data memory 130. Byte size unidirectional transfers are performed in a similar manner as the word transfers with the exception that the four registers 132 are loaded one at a time. The order of loading the registers 132 is U89, U95, U101 and then U105. The byte transfer requires that bits 00 through 07 be jumped to bits 08 through 15 at the cabinet connector.

For dual port unidirectional output mode, the unidirectional output transfers are controlled by state machine 162. Differential drivers 140 (e.g., U14, U13, U12 and U11) are enabled to select bits 16 through 31 as the output data. For a word or byte transfer, the port B clock enables for registers 132 ( e.g., U96, U90, U104 and U100) are asserted and the data read from memory 130. During a word transfer, the differential drivers 140 for bits 16 through 31 (e.g., U24, U23, U22 and U21) are enabled. The port A output enable is also asserted for registers 132 (e.g., U96 and U90) to output the first word and then followed by the port A output enable for registers 132 (e.g., U104 and U100) to output the second word. Byte size unidirectional transfers are performed in a similar manner as the word transfers with the exception that only two of the differential drivers 140 are enabled at any one time (8 bits) and the transfer is two cycles longer. The byte transfer requires that bits 16 through 23 be jumped to bits 24 through 31 at the cabinet connector.

Once the downloadable RAM's 120 have been set up as programmable handshake state machines 108 and 162, the address generators for the I/O memory 130 are initialized. All addressing of the I/O memory 130 is completed through the memory control and address generator 148. The memory control and address generator 148 is the address generator for the three port controllers and the buffer for addresses from the local bus (host 106). This is the sole source of addressing to the buffer RAM 130. The three port controllers are the two interface ports and the internal global memory port. The memory control and address generator 148 includes three 15-bit address generators, ending address latches, and comparators (not shown). It also includes a four-to-one multiplexer and a readback capability for the selected address generator output. This is all contained within a single Actel programmable gate array. The memory control and address generator 148 is set up via a 15 bit data bus and a 15 bit address bus from the host 106 and is controlled by memory grant signals from the data memory arbitration logic 146. Each address generator receives a starting address and an ending address for the transfer to or from the data memory 130. Each address generator output can be read-back as a test and status feature.

An example download program is representative of the software used to generate data for download to the programmable state machine 108 and software necessary to implement the same. The state machine 108 is programmed to control a 32-bit bidirectional transfer to and from another circuit card. The software program listing is included in Appendix "A" on pages A1 to A4 located at the end of the instant specification.

Figure 5:
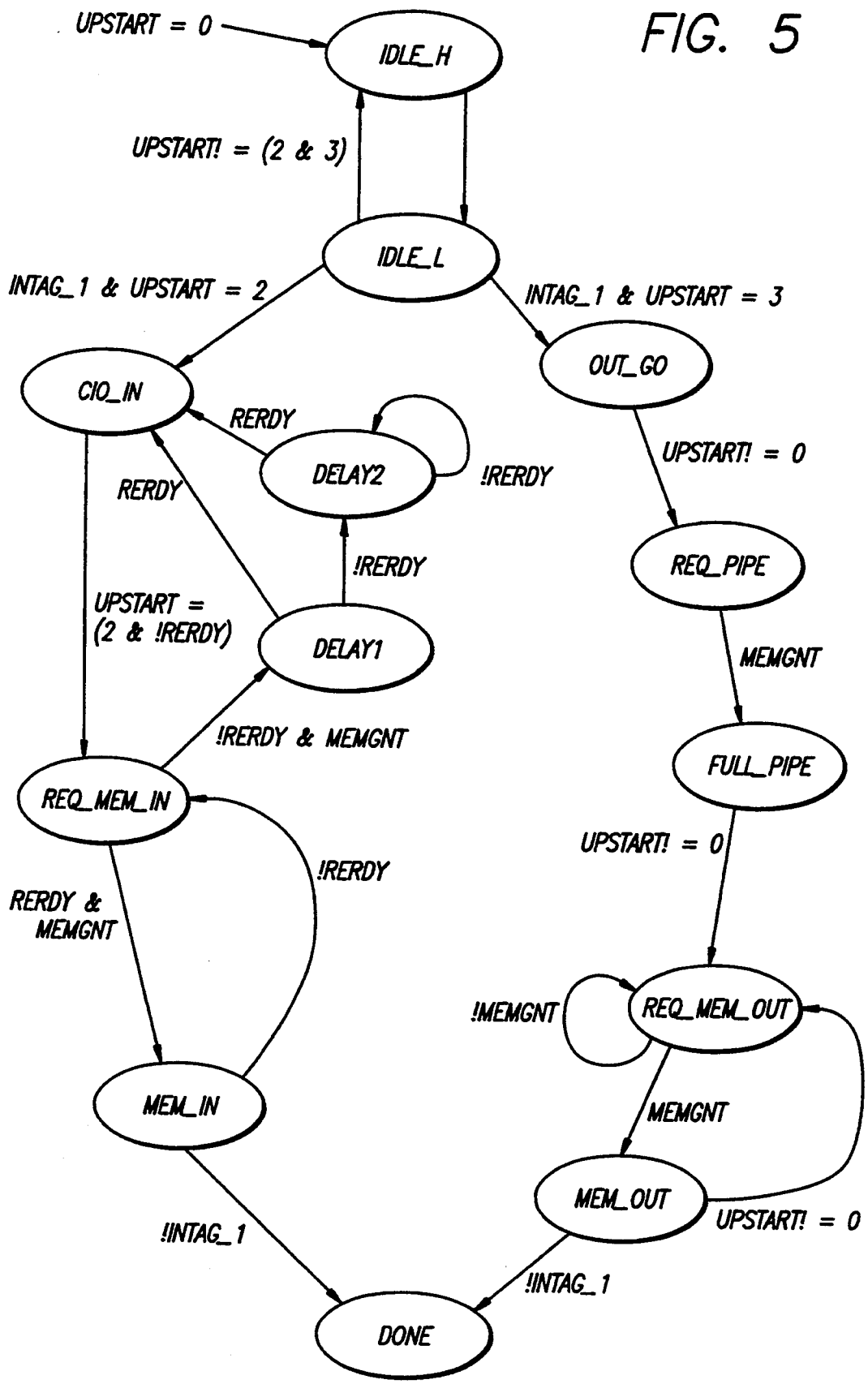
FIG. 5 is a flow diagram of the method for utilizing the reconfigurable computer interface to connect the internal circuitry of the signal processing system with the external peripheral device.

The associated state diagram shown in FIG. 5 is a graphical representation of the case statements used in the computer program entitled *SPC #1 Download Data For IO Test With DIO And CIO*. The state diagram starts in the IDLE mode and waits for an input to select a branch to the right or a branch to the left. The branch to the left represents a transition to a data input mode. The branch to the right represents a transition to a data output mode. Once the branch has been taken, the path must be followed until reaching the DONE state. The following is a description of the individual states.

IDLE_H

The state machine 108 has been loaded with the appropriate state table data and the microprocessor command word was set to zero (upstart=0) which means "Do Nothing". The state machine 108 will automatically transition to the IDLE_L state at the beginning of the next clock cycle (time increment). During this state, the reconfigurable computer interface 100 outputs the sensor clock (SCLK) to a HIGH level and holds the ready signal (CRDY) to an inactive HIGH level.

IDLE_L

From this state, there are three possible paths.

The first path is back to IDLE_H and this path is selected if the microprocessor command word is still set to zero. As long as the command word is set to zero, the states will cycle between IDLE_H and IDLE_L. The purpose for this cycle is to provide a sensor clock to the external device 104.

The second path is to the OUT_GO state. The transition to this path occurs when the address generator signal INTAG_L is HIGH and the microprocessor command signal has been set to three (upstart=3). The HIGH INTAG_L signal is an indication that the address generator has been initialized for the impending transfer of data. This signal stays high until the required number of data words have been transferred. The command word "upstart=3" is a command by the microprocessor to transition to the data output mode.

The third path is to the CIO_IN state. The transition to this path occurs when the INTAG_L signal is HIGH and the microprocessor command word is set to two (upstart=2). The HIGH INTAG_L signal is an indication that the address generator has been initialized for the impending transfer of data. The signal stays high until the required number of data words have been transferred. The command word "upstart=2" is a command by the microprocessor to transition to the data input mode.

During the period that the state machine is in the IDLE_L state, the interface 100 outputs the sensor clock (SCLK) to a LOW level and holds the ready signal (CRDY) to an inactive HIGH level.

CIO_IN

This state was entered from one of three states. During this state, the ready signal is set active (CRDY=LOW) and the read/write signal is set to write to memory (RDWRL=LOW). This state transitions to the REQ_MEM_IN state when the external device 104 is ready (RERDY=LOW) unless the microprocessor interrupts the transition by sending a "do nothing" command word (upstart=0).

The first possible path is from the IDLE_L state. This would imply that the transfer is just beginning and the interface 100 has been initialized to input data from an external device 104.

The other two paths to this state come from the DELAY1 and DELAY2 states. These states will be discussed later.

REQ_MEM_IN

This state is entered from the CIO_IN state. The function of this state is to request a memory location (MEMRQ=LOW) to store the input data. The next state to transition to is determined by the external ready and the memory location granted signals. The memory location request must be granted (MEMGNT=HIGH) to leave this state. With the memory grant present, the next state will be MEM_IN if the external ready signal is inactive (RERDY=HIGH) and will be DELAY1 if the external ready signal is active (RERDY=LOW).

MEM_IN

This state is entered from the REQ_MEM_IN state. During this state, the data is loaded into memory and the request for a memory location is deasserted (MEMRQ=HIGH). The state machine 108 remains in this state until the external ready becomes active (RERDY=LOW) or the address generator signals that the transfer is complete by setting the transfer complete interrupt (INTAG_L=LOW). If the transfer is not complete and the external device 104 becomes ready, the state transitions back to REQ_MEM_IN. Under optimum conditions, the state machine would now cycle between REQ_MEM_IN and MEM_IN until the address generator interrupt occurs signaling the end of the transfer.

DELAY1

DELAY1 is a state entered from the REQ_MEM_IN state when the external device 104 becomes temporarily disabled and cannot respond with an inactive signal (RERDY=HIGH). If the external device 104 recovers within one clock cycle, then the state will transition to CIO_IN. If the recovery does not occur within one clock cycle, then the state will transition to DELAY2. During this state, the data is loaded into memory and the request for a memory location is deasserted (MEMRQ=HIGH).

DELAY2

DELAY2 is entered from DELAY1 as described above. Once in DELAY2, the state will not transition to CIO_IN until the external device 104 goes inactive (RERDY=HIGH). DELAY2 is a hold condition.

DONE

This state is reached from the MEM_IN state when the address generator has signaled that the correct number of words have been transferred. The only way to leave this state is by command of the microprocessor (upstart=0) and then the state transitions to IDLE_H.

OUT_GO

This state is entered from the IDLE_L state when the microprocessor command word is set to three (upstart=3). This state always transitions to the REQ_PIPE state on the following clock cycle unless interrupted by the microprocessor (upstart=0) and transitioned back to IDLE_H. During this state, the sensor clock is set active (SCLK=HIGH).

REQ_PIPE

This state is entered from the OUT_GO state. During this state, the first memory location of the data transfer is requested (MEMRQ=LOW) and the sensor clock is set inactive (SCLK=LOW). Once it is granted (MEMGNT=HIGH), the state transitions to the FULL_PIPE state.

FULL_PIPE

This state is entered from the REQ_PIPE state. During this state, the memory location request is set inactive (MEMRQ=HIGH) and the sensor clock is set active (SCLK=HIGH). The first word of the transfer is now ready to be sent to the external device 104. If the microprocessor does not interrupt the state machine 108, the next state is REQ_MEM_OUT.

REQ_MEM_OUT

This state is entered from the FULL_PIPE state on the first word of the transfer and from MEM_OUT thereafter. During this state, the next memory location of the data transfer is requested (MEMRQ=LOW) and the sensor clock is set inactive (SCLK=LOW). If the memory request is granted, (MEMGNT=HIGH), then the state transitions to MEM_OUT.

MEM_OUT

This state is entered from the REQ_MEM_OUT state. During this state, the data is read from memory and the request for a memory location is deasserted (MEMRQ=HIGH). The state machine 108 transitions to state REQ_MEM_OUT on the next clock cycle unless the address generator signals that the transfer is complete by setting the transfer complete interrupt (INTAG_L=LOW). The state would then transition to the DONE state. If the transfer is not complete, the state transitions back to REQ_MEM_OUT. Under optimum conditions, the state machine 108 would now cycle between REQ_MEM_OUT and MEM_OUT until the address generator interrupt occurs signaling the end of the transfer.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such modifications, applications and embodiments within the scope of the present invention.

Accordingly,

What is claimed is:

1. A general purpose, reconfigurable parallel-to-parallel interface system for interfacing a first data bus from a first digital subsystem to a second data bus from a second digital subsystem, the interface system comprising:

buffer memory storage means for providing temporary storage of a plurality of data signals transmitted between said first and second subsystems, said buffer memory storage means operating in response to memory storage control signals;

programmable bus sizing means for modifying the word size of a plurality of data signals transmitted between said first and second subsystems in response to bus sizing control signals;

level translating means connected to said first digital subsystem for translating the electrical levels of a plurality of data signals on said first data bus to electrical levels of said reconfigurable system;

reconfigurable state machine means for generating a plurality of interface control signals in accordance with a state table in response to a plurality of external condition signals, said external condition signals including mode control signals, said interface control signals including said memory storage control signals and said bus sizing control signals;

means for establishing a data path through said interface system for connecting said first data bus to said second data bus, said data path comprising said buffer memory storage means, said bus sizing means and said level translating means;

control signal path means for establishing a control signal path between said state machine means and said first digital subsystem, said control signal path being separate from said data path through the interface system and for carrying handshake control signals between said state machine means and said first digital subsystem, said handshake control signals comprising said external condition signals;

host processor means for generating said state table and said mode control signals for said state machine means; and wherein said state machine means operates autonomously from said host processor means upon receiving said state table and said mode control signals until said host processor generates a fresh state table and mode control signals to reconfigure the interface system.

2. The reconfigurable system of claim 1 wherein said reconfigurable state machine means comprises a downlodable random access memory.

3. The reconfigurable system of claim 2 wherein said downloaded random access memory comprises a storage element register.

4. The reconfigurable system of claim 1 wherein said reconfigurable state machine means comprises a programmable array logic device.

5. The reconfigurable system of claim 1 wherein said host processor means comprises a host microprocessor.

6. The reconfigurable system of claim 1 wherein said level translating means comprises a differential receiver-driver circuit.

7. The reconfigurable system of claim 1 wherein said bus sizing means comprises a plurality of bus sizing registers.

8. The reconfigurable system of claim 1 wherein said buffer storage means includes a buffer having a random access memory.

9. The reconfigurable system of claim 8 further including an address generating means for selecting a storage location within said random access memory for temporarily storing a data word signal.

10. The reconfigurable system of claim 9 wherein said address generating means includes a memory control and address generator.

11. The reconfigurable system of claim 9 wherein said address generating means further includes a memory arbitration means for controlling access of said data word signal to said random access memory.

12. A general purpose, reconfigurable parallel-to-parallel interface system for interfacing a first parallel data bus from an external peripheral device to a second parallel data bus from a signal processing system, the interface system comprising:

buffer memory storage means for providing temporary storage of a plurality of data signals transmitted between said external peripheral device and said signal processing device, said buffer memory storage means operating in response to memory storage control signals;

programmable bus sizing means for modifying the word size of a plurality of data signals transmitted between said external peripheral device and said signal processing device in response to bus sizing control signals;

level translating means connected to said first data bus for translating the electrical levels of a plurality of data signals on said first data bus to electrical levels of said reconfigurable interface system;

reconfigurable state machine means for generating a plurality of interface control signals in accordance with a state table in response to a plurality of external condition signals, said external condition signals including mode control signals, said interface control signals including said memory storage control signals and said bus sizing control signals;

means for establishing a data path through said interface system for connecting said first data bus to said second data bus, said data path comprising said buffer memory storage means, said bus sizing means and said level translating means;

control signal path means for establishing a control signal path between said state machine means and said external peripheral device, said control signal path being separate from said data path through the interface system and for carrying handshake control signals between said state machine means and external peripheral device, said handshake control signals comprising said external condition signals;

host processor means for generating said state table and said mode control signals for said state machine means; and wherein said state machine means operates autonomously from said host processor means upon receiving said state table and said mode control signals until said host processor generates a fresh state table and mode control signals to reconfigure the interface system.

* * * * *